(12) United States Patent
Jeon et al.

(10) Patent No.: US 8,927,084 B2
(45) Date of Patent: Jan. 6, 2015

(54) GROOVED TYPE VACUUM THERMAL INSULATION MATERIAL AND A PRODUCTION METHOD FOR THE SAME

(75) Inventors: Seung-Min Jeon, Busan (KR); Sung-Seock Hwang, Cheongju-si (KR); Suk Jang, Seoul (KR); Myung Lee, Hwaseong-si (KR); Jung-Pil Han, Ulsan (KR)

(73) Assignee: LG Hausys, Ltd., Seoul (KR)

( * ) Notice: Subject to any disclaimer, the term of this patent is extended or adjusted under 35 U.S.C. 154(b) by 246 days.

(21) Appl. No.: 13/510,092

(22) PCT Filed: Mar. 2, 2011

(86) PCT No.: PCT/KR2011/001447
§ 371 (c)(1),
(2), (4) Date: May 16, 2012

(87) PCT Pub. No.: WO2011/108850
PCT Pub. Date: Sep. 9, 2011

(65) Prior Publication Data
US 2012/0231204 A1 Sep. 13, 2012

(30) Foreign Application Priority Data
Mar. 4, 2010 (KR) .......................... 10-2010-0019444

(51) Int. Cl.
*F16L 59/065* (2006.01)
(52) U.S. Cl.
CPC ........... *F16L 59/065* (2013.01); *F25D 2201/14* (2013.01)
USPC .......................................................... 428/69
(58) Field of Classification Search
CPC .............................. F16L 59/065; E04B 1/803
USPC ............................................................ 428/69
See application file for complete search history.

(56) References Cited

U.S. PATENT DOCUMENTS 5,032,439 A     7/1991  Glicksman et al.
5,273,801 A *  12/1993  Barry et al. ..................... 428/69

(Continued)

FOREIGN PATENT DOCUMENTS

CN     1425116 A     6/2003
JP    55-91656 A     7/1980

(Continued)

OTHER PUBLICATIONS

Chinese Office Action dated Nov. 22, 2013.

(Continued)

*Primary Examiner* — Alexander Thomas
(74) *Attorney, Agent, or Firm* — Lowe Hauptman & Ham, LLP

(57) ABSTRACT

The present invention relates to a groove-type vacuum insulation material and a method of manufacturing the same. The groove-type vacuum insulation material includes core materials each having a block shape, at least one lateral wall of which has an inclined surface; a groove-type insulation board, in which the core materials are arranged on a plane of the board to be separated from each other, with the inclined surfaces thereof facing each other; an outer skin material formed in a film pouch shape and surrounding the entirety of upper and lower sides of the groove-type insulation board, the outer skin material being brought into close contact with the groove-type insulation board by vacuum-sealing, and exhibiting bending characteristics in a space between the core materials. The present invention also relates to a method of manufacturing the same.

19 Claims, 3 Drawing Sheets

(56) References Cited

U.S. PATENT DOCUMENTS

| | | | |
|---|---|---|---|
| 5,843,353 A | 12/1998 | De Vos et al. | |
| 2004/0180176 A1* | 9/2004 | Rusek, Jr. | 428/69 |

FOREIGN PATENT DOCUMENTS

| | | |
|---|---|---|
| JP | 7-98090 | 4/1995 |
| JP | 7-113493 | 5/1995 |
| JP | 2000-220955 | 8/2000 |
| JP | 2001-336691 | 12/2001 |
| JP | 2006-138336 | 6/2006 |
| JP | 2006183810 A | 7/2006 |
| KR | 10-2001-0023799 | 3/2001 |
| KR | 10-2007-0091534 | 9/2007 |
| WO | WO 03/089729 A1 * | 10/2003 |

OTHER PUBLICATIONS

International Search Report mailed Sep. 28, 2011 for PCT/KR2011/001447.
Japanese Office Action dated Feb. 27, 2014.
European Extended Search Report dated Sep. 24, 2014.

* cited by examiner

GROOVED TYPE VACUUM THERMAL INSULATION MATERIAL AND A PRODUCTION METHOD FOR THE SAME

CROSS REFERENCE TO RELATED APPLICATION

This application claims the priority of Korean Patent Application No. 10-2010-0019444, filed on Mar. 4, 2010 in the KIPO (Korean Intellectual Property Office). Further, this application is the National Phase application of International Application No. PCT/KR2011/001447 filed Mar. 2, 2011, which designates the United States and was published in Korean.

TECHNICAL FIELD

The present invention relates to a groove-type vacuum thermal insulation material and a method of manufacturing the same, and more particularly, to a technology of manufacturing a groove-type vacuum insulation material that has flexibility with core materials processed as blocks.

BACKGROUND ART

A vacuum insulation material has thermal conductivity eight or more times lower than that of a typical insulation material and thus has attracted attention as a next-generation high efficiency insulation material. However, since the vacuum insulation material is mainly manufactured as a board type under high vacuum conditions, it is difficult to bend the vacuum insulation material.

At a portion that needs bending of an insulation material, it is difficult to use a vacuum insulation material and thus a general insulation material is used together with the vacuum insulation material to complement the vacuum insulation material by filling the corresponding portion with the general insulation material.

Therefore, there is a need for a groove-type vacuum insulation material that can maintain performance of a vacuum insulation material for a long time by minimizing stress to an outer skin material and be easily bent as needed.

FIG. 1 is a side-sectional view of a general vacuum insulation material.

Referring to FIG. 1, a general vacuum insulation material 30 includes a core material 10 formed as a monolithic board and an outer skin material 20 surrounding the core material.

This type of insulation material does not have bending properties and, in order to perform groove-type vacuum insulation, a plurality of vacuum insulation materials 30 is used or the core material 10 is forcibly bent. However, such forcible bending can apply stress to the core material or the outer skin material, thereby deteriorating characteristics of vacuum insulation.

FIG. 2 is a plan view of one example of the conventional vacuum insulation material, which is applied to an insulation space such as a refrigerator.

Referring to FIG. 2, a box-shaped refrigerator case 50 is provided. Thus, a vacuum insulation material needs to surround four sides of the case 50. However, the general insulation material as shown in FIG. 1 cannot be provided in the form of a groove-type vacuum insulation material surrounding the four sides of the case at the same time.

Thus, it is necessary to use four vacuum insulation materials 30a, 30b, 30c, 30d. In this case, however, manufacturing costs increase and it is inconvenient to apply the insulation materials due to an increased number of insulation materials.

In addition, perfect insulation will not be obtained due to a space between the insulation materials at a corner of the case.

To solve these problems, a flexible core material or a monolithic board type core material having grooves to provide flexibility is used.

However, even in these cases, it is difficult to achieve complete bending properties and the outer skin material is likely to be broken.

DISCLOSURE

Technical Problem

The present invention is directed to providing a groove-type vacuum insulation material and a method of manufacturing the same, in which core materials, each being processed to a block shape having inclined surfaces at lateral walls, are linearly arranged and covered with an outer skin material, so that the groove-type vacuum insulation material facilitates adjustment of the degree of bending via the inclined surfaces of the core material, maintains performance of vacuum insulation for a longer time than the conventional groove-type vacuum insulation material by minimizing stress to the outer skin material upon bending, and can be easily bent as needed.

Technical Solution

One aspect of the present invention provides a groove-type vacuum insulation material, which includes: core materials each having a block shape, at least one lateral wall of which has an inclined surface; a groove-type insulation board, in which the core materials are arranged on a plane of the board to be separated from each other, with the inclined surfaces thereof facing each other; an outer skin material formed in a film pouch shape and surrounding the entirety of upper and lower sides of the groove-type insulation board, the outer skin material being brought into close contact with the groove-type insulation board by vacuum-sealing, and exhibiting bending characteristics in a space between the core materials.

The core material may include one or more selected from among glass wool, silica boards, glass boards, and polyurethane (PU) foam; the core material may have one planar shape selected from among triangular, rectangular, circular and polygonal planar shapes; and an angle between the inclined surface and the bottom of the core material may be in the range of 15 to 60 degrees.

The outer skin material may include at least one material selected from among linear density polyethylene (LDPE), linear low density polyethylene (LLDPE), high density polyethylene (HDPE), chlorinated polypropylene (CPP), and oriented polypropylene films; and the outer skin material may have flexibility in a space between the core materials, and a joined portion of the outer skin material be formed coplanar with the bottom of the core materials.

Another aspect of the present invention provides a method of manufacturing a groove-type vacuum insulation material, which includes: forming core materials each having a block shape, at least one lateral wall of which has an inclined surface; forming a groove-type insulation board, in which the core materials are arranged on a plane of the board to be separated from each other, with the inclined surfaces thereof facing each other; inserting the groove-type insulation board into an outer skin material through an opening at one side of the outer skin material having a pouch shape; evacuating the outer skin material through the opening in a vacuum chamber to provide a vacuum; forming a vacuum insulation material by sealing the opening under a vacuum; and heating the vacuum insulation material after moving the sealed vacuum insulation material from the vacuum chamber to an oven.

The sealing the opening may include finishing the opening of the outer skin material by thermal sealing; the heating the vacuum insulation material may include heating the vacuum insulation material at a temperature of 150 to 200° C.; the heating the vacuum insulation material may include heating the vacuum insulation material by infrared radiation heating or hot air heating; and the oven may include a vacuum oven.

The forming the groove-type insulation board may include arranging the core materials on a plane of a base film, and the base film may include the same material as a thermal deposition layer of the outer skin material.

Advantageous Effects

According to the present invention, a groove-type vacuum insulation material employs block-type core materials, each of which has an inclined surface at a lateral wall thereof, such that the core materials are brought into complete contact with a target surface through the inclined surfaces thereof when the vacuum insulation material is bent onto the target surface, providing highly improved insulation effects.

In addition, according to one embodiment, the outer skin material joined in the space may be formed coplanar with the bottom of the core materials, so that the bent surfaces of the vacuum insulation material can be brought into complete contact with a target surface, thereby providing good insulation effects and minimizing cracking of the outer skin material.

Further, according to the present invention, the method of manufacturing a groove-type vacuum insulation material allows a bending angle to be freely adjusted through inclined surfaces of the core materials, and minimizes stress applied to the outer skin material when the material is bent, thereby maintaining vacuum insulation performance for a longer time than the conventional groove-type vacuum insulation material, and facilitating variation of shapes as needed.

Further, according to one embodiment, it is possible to omit a conventional process of pressing a core material to form a groove, thereby improving vacuum insulation performance and preventing cracking in the outer skin material.

Further, according to another embodiment, in the step of forming a groove-type insulation board, a plurality of core materials is arranged on a base film, which is the same material as a thermal deposition layer of the outer skin material, thereby facilitating thermal deposition between the base film and the outer skin material.

BEST MODE

Figure 1:
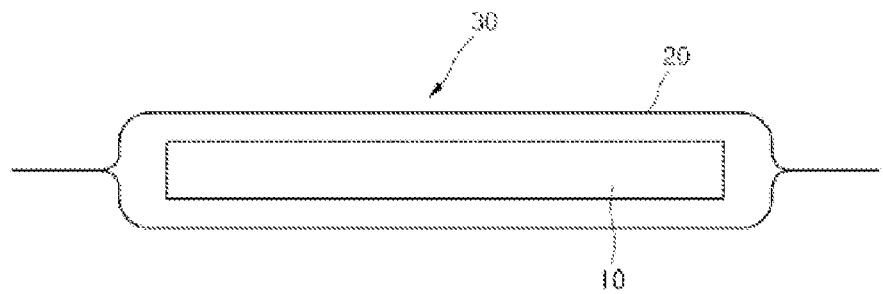
FIG. 1 is a side-sectional view of a conventional vacuum insulation material.

Details of embodiments of the present invention are included in the detailed description of the invention and the accompanying drawings.

The above and other aspects, features, and advantages of the invention will become apparent from the detailed description of the following embodiments in conjunction with the accompanying drawings. It should be understood that the present invention is not limited to the following embodiments and may be embodied in different ways, and that the embodiments are given to provide complete disclosure of the invention and to provide a thorough understanding of the invention to those skilled in the art. The scope of the invention is defined only by the claims. Like components will be denoted by like reference numerals throughout the specification Embodiments of the present invention will now be described in detail with reference to the accompanying drawings.

Figure 3:
FIG. 3 is a side-sectional view of a core material of a groove-type vacuum insulation material according to one embodiment of the present invention.

FIG. 3 is a side-sectional view of a core material of a groove-type vacuum insulation material according to one embodiment of the present invention.

Referring to FIG. 3, a core material 100 has a trapezoidal cross-section, with lateral walls thereof processed to have inclined surfaces 100a.

The core material 100 may be composed of one or more materials selected from among glass wool, silica boards, glass boards and polyurethane foam.

The core material 100 according to the embodiment of the invention may be formed by stacking plural sheets of these materials one above another, or formed in a single block shape using these materials, in which one or more lateral walls of the block shape have the inclined surface(s) 100a.

The core material 100 may have one planar shape selected from among triangular, rectangular, circular and polygonal planar shapes.

With various cross-sectional shapes as above, the groove-type vacuum insulation material according to the present invention may have various three-dimensional shapes. For example, with three sides of each core material processed to have inclined surfaces, triangular block-type core materials are disposed in a triangular pyramidal arrangement and then subjected to vacuum heating through an outer skin material, thereby forming a groove-type vacuum insulation material having a triangular pyramid shape.

Thus, the core material 100 according to the present invention may be manufactured in various shapes according to a desired shape of the vacuum insulation material. Here, at least one lateral wall of the core material 100 has the inclined surface 100a.

Further, in the case of forming three-dimensional vacuum insulation material as described above, a bending angle between surfaces may be determined in accordance with the angle of the inclined surface 100a.

Thus, an angle $\theta_1$ between the inclined surface 100a and the bottom of the core material 100 according to this embodiment may be in the range of 15 to 60 degrees. If the angle $\theta_1$ of the inclined surface 100a is less than 15 degrees, the core material is thin near the inclined surface thereof, so that characteristics of the vacuum insulation can be deteriorated and stress can be applied to the outer skin material when the groove-type vacuum insulation material is bent.

If the angle $\theta_1$ of the inclined surface 100a exceeds 60 degrees, groove characteristics can be little and the outer skin material can be subjected to stress when the groove-type vacuum insulation material is bent.

As described above, the core material 100 according to the embodiment of the invention may be formed as a block having an inclined surface on the lateral wall thereof. For reference, the size and shape of the core material 100 may be varied depending on the desired shape of the vacuum insulation material and the distance between the core materials 100 may thus be adjusted. Next, a method of manufacturing a groove-type vacuum insulation material according to one embodiment of the present invention will be described in detail together with a method of arranging core materials and a method of forming an outer skin material.

Figure 4:
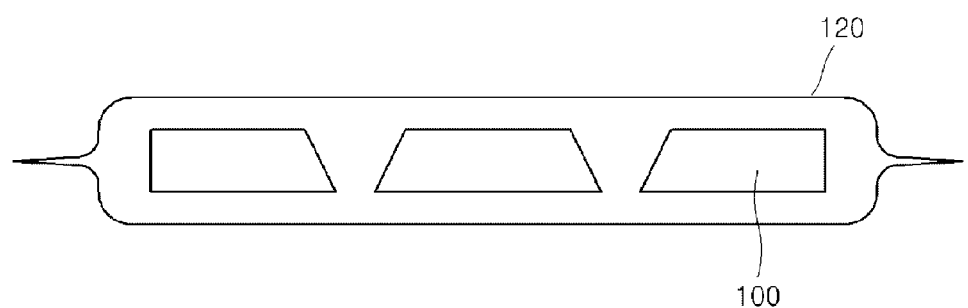
FIG. 4 is a side-sectional view of a method of manufacturing a groove-type vacuum insulation material according to one embodiment of the present invention.

FIG. 4 is a side-sectional view of a method of manufacturing a groove-type vacuum insulation material according to one embodiment of the present invention.

Referring to FIG. 4, block-type core materials 100 are arranged such that inclined surfaces of the core materials 100 are separated a predetermined distance from each other while facing each other. Although there is no particular limitation as to the distance between the inclined surfaces, it may be adjusted in consideration of bending characteristics described below.

Here, the core material 100 may be arranged on the base film. The base film may be formed of the same material as a thermal deposition layer of the outer skin material, thereby facilitating thermal deposition with the outer skin material.

Next, a groove-type insulation board formed as above is inserted into the outer skin material 120 through an opening provided at one end of the outer skin material 120 having a pouch shape.

Here, the shape of the outer skin material 120 is not limited to the pouch shape. Alternatively, a groove-type insulation board is put on a lower outer skin material and covered with an upper outer skin material, and then outer edges of the groove-type insulation board are sealed to form a pouch shape. At this time, all processes may be performed in a vacuum chamber. Further, the groove-type insulation board is stably seated within the outer skin material 120, and the inner pressure of the outer skin material 120 is lowered through the opening.

The process of lowering the inner pressure refers to a process of evacuating the outer skin material 120 to a vacuum, and the vacuum insulation material is formed by thermally sealing the opening under a vacuum.

Figure 5:
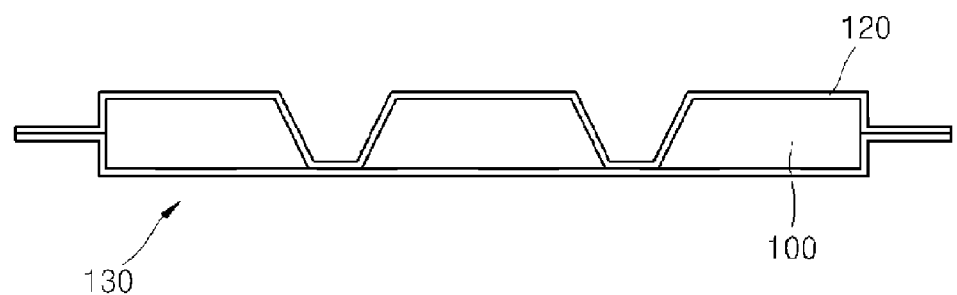
FIG. 5 is a side-sectional view of a groove-type vacuum insulation material according to one embodiment of the present invention.

As a result, the vacuum insulation material is formed as shown in FIG. 5. Then, the vacuum insulation material is heated after being carried from the vacuum chamber to an oven.

FIG. 5 is a side-sectional view of a groove-type vacuum insulation material according to one embodiment of the present invention.

FIG. 5 illustrates a groove-type vacuum insulation material 130 in which respective block-type core materials 100 are independently subjected to vacuum compression within outer skin materials 120.

As such, the groove-type vacuum insulation material 130 according to the embodiment of the invention has a joined portion of the outer skin materials 120 between the core materials 100. Thus, free bending characteristics may be exhibited at this joined portion, and the core materials 100 or the outer skin materials 120 are not damaged even in a bent state on the contrary to those of the art.

In order to improve bending characteristics, the outer skin materials 120 need to be brought into more close contact with the core materials 100, and such close contact is also needed at the joined portion between the outer skin materials 120. Here, the outer skin materials 120 exhibit bending characteristics in a gap between the core materials 100 and the jointed portion is formed coplanar with the bottom of the core materials 100, thereby minimizing cracking of the outer skin materials 120.

All of the above processes are performed in an oven, for example, in a vacuum oven. At this time, heating temperature may be in the range of 150 to 200° C. If the heating temperature is lower than 150° C., the outer skin materials 120 can be insufficiently joined. If the heating temperature is higher than 200° C., the outer skin materials 120 can be damaged due to such a high heating temperature.

Thus, in order to adjust the temperature, heating of the vacuum insulation material may be performed by infrared radiation heating or hot air heating.

Through these processes, the groove-type vacuum insulation material 130 according to the present invention is completed, and bending characteristics thereof are as follows.

Figure 6:
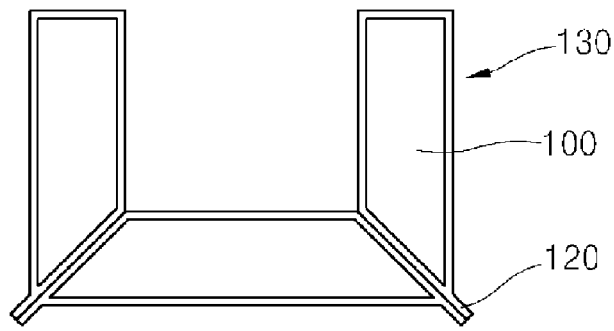
FIG. 6 is a side-sectional view of the groove-type vacuum insulation material according to the embodiment of the present invention, showing bending characteristics.

FIG. 6 is a side-sectional view of the groove-type vacuum insulation material according to the embodiment of the invention, showing bending characteristics thereof.

In FIG. 6, the vacuum insulation material 130 is bent such that the inclined surfaces of the core materials 100 face each other.

At this time, part of the outer skin material 120 is bent to protrude outward through the space between the core materials. Such bending characteristics prevent deterioration of vacuum insulation characteristics even at the bent portion. As the outer skin material 120 partially protrudes, severe bending is prevented and stable bending characteristics are exhibited, thereby minimizing damage of the outer skin material.

Conventionally, a special material is additionally inserted into a space between the stacked outer skin materials so as to prevent the outer skin materials from suffering from bending damage. However, since the vacuum insulation material according to the present invention exhibits stable bending characteristics as described above, there is no need for separate compensation. Therefore, two or three sheets of films basically used for the outer skin materials may be stacked, and it is possible to use low melting point polyolefin films, such as linear density polyethylene (LDPE), linear low density polyethylene (LLDPE), high density polyethylene (HDPE), chlorinated polypropylene (CPP) films, oriented polypropylene films, or the like.

Next, one example of the vacuum insulation material according to the present invention will be described.

Figure 7:
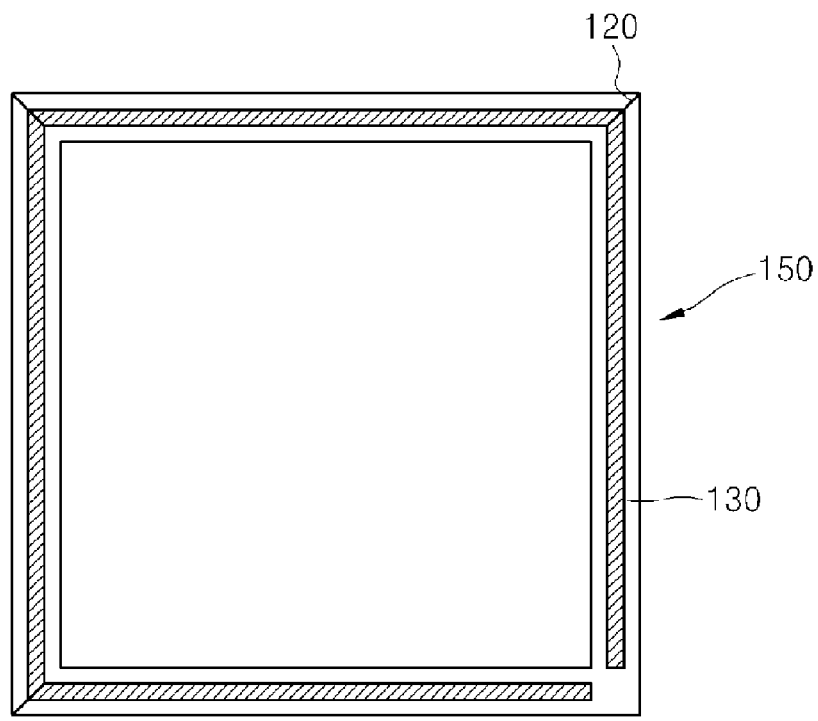
FIG. 7 is a plan view of one example of the groove-type vacuum insulation material according to the embodiment of the present invention, which is applied to an insulation space such as a refrigerator.

FIG. 7 is a plan view of one example of the groove-type vacuum insulation material according to the embodiment of the present invention, which is applied to an insulation space such as a refrigerator.

Figure 2:
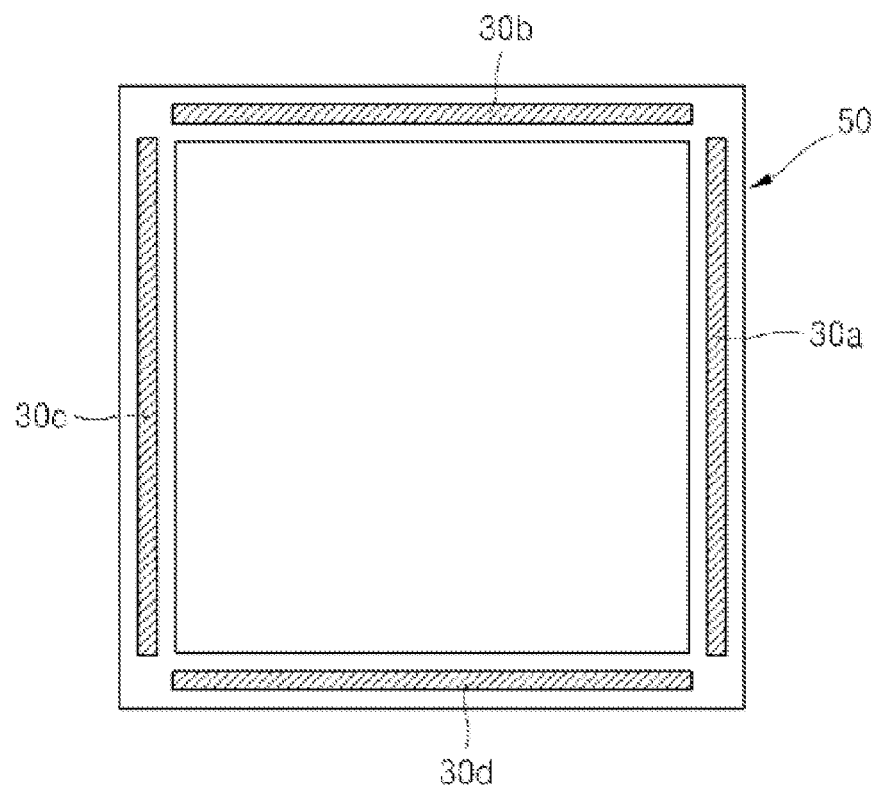
FIG. 2 is a plan view of one example of applying the conventional vacuum insulation material, which is applied to an insulation space such as a refrigerator.

FIG. 7 shows one example of the groove-type vacuum insulation material 130 according to the present invention, which is applied to a box-shaped refrigerator case 150 as described in FIG. 2. Contrary to FIG. 2, FIG. 7 illustrates an insulation structure using a single vacuum insulation material 130.

In this case, the insulation structure is formed as a single body even at corners of the box shape, and thus there is no loss of insulation characteristics. In addition, protruding part of the outer skin material 120 may be securely fitted to the corners, thereby providing a stable insulation structure.

According to the embodiments, the groove-type vacuum insulation material is manufactured using core materials processed to have a block shape with an inclined lateral wall, so that stress to the outer skin material can be minimized, thereby maintaining performance of the vacuum insulation material for a long time and allowing easy bending of the vacuum insulation material as needed.

According to the embodiments, the vacuum insulation material solves inconvenience caused by use of a particular outer skin material or a pressing process for making grooves in an insulation material, reducing manufacturing costs. Further, in the vacuum insulation material, the outer skin material does not suffer from cracking, thereby enhancing reliability of the vacuum insulation material.

Although some exemplary embodiments have been described with reference to the accompanying drawings, the present invention may be embodied in many different ways without departing from the spirit and scope of the invention and should not be construed as being limited to the embodiments set forth herein.

It will be understood by those skilled in the art that various modifications, changes, alterations, and equivalent embodiments can be made without departing from the spirit and scope of the invention. Therefore, it should be appreciated that the foregoing embodiments are provided for illustrative purposes only and are not to be in any way construed as limiting the present invention.

The invention claimed is:

1. A vacuum insulation material, comprising:
   core materials each having a block shape and at least one lateral wall of which has an inclined surface;
   an insulation board, in which the core materials are arranged on a plane of the board to be separated from each other, with the inclined surfaces thereof facing each other;
   an outer skin material in a film pouch shape and surrounding an entirety of upper and lower sides of the insulation board, the outer skin material being in close contact with the insulation board, and capable of bending in a space between the core materials,
   wherein the inclined surfaces of adjacent core materials, facing each other, are configured to directly contact each other when the outer skin material is bent, and
   wherein a part of the outer skin material is configured to be bent and to protrude outward through the space between the core materials.

2. The vacuum insulation material of claim 1, wherein the core material comprises one or more selected from the group consisting glass wool, silica boards, glass boards, and polyurethane (PU) foam.

3. The vacuum insulation material of claim 1, wherein the core material include one planar shape selected from among triangular, rectangular, circular and polygonal planar shapes.

4. The vacuum insulation material of claim 1, wherein an angle between the inclined surface and a bottom of the core material is in the range of 15 to 60 degrees.

5. The vacuum insulation material of claim 1, wherein the outer skin material comprises at least one material selected from the group consisting linear density polyethylene (LDPE), linear low density polyethylene (LLDPE), high density polyethylene (HDPE), chlorinated polypropylene (CPP), and oriented polypropylene films.

6. The vacuum insulation material of claim 1, wherein the outer skin material has flexibility in the space between the core materials, and a joined portion of the outer skin material is formed coplanar with a bottom of the core materials.

7. The vacuum insulation material of claim 1, wherein each of the core materials comprises a plurality of stacked sheets.

8. The vacuum insulation material of claim 1, wherein each of the core materials comprises a single block.

9. The vacuum insulation material of claim 1, wherein the outer skin material comprises a material selected from the group consisting of linear low density polyethylene (LLDPE), chlorinated polypropylene (CPP), and oriented polypropylene films.

10. The vacuum insulation material of claim 1, wherein the outer skin material comprises two materials selected from the group consisting of linear low density polyethylene (LLDPE), chlorinated polypropylene (CPP), and oriented polypropylene films.

11. The vacuum insulation material of claim 1, wherein the outer skin material comprises linear low density polyethylene (LLDPE), chlorinated polypropylene (CPP), and oriented polypropylene films.

12. A method of manufacturing a vacuum insulation material, comprising:
   forming core materials each having a block shape and at least one lateral wall of which has an inclined surface;
   forming an insulation board, in which the core materials are arranged on a plane of the board to be separated from each other, with the inclined surfaces thereof facing each other, wherein the inclined surfaces facing each other are configured to directly contact each other when an outer skin material is bent, and wherein a part of the outer skin material is configured to be bent and to protrude outward through the space between the core materials;
   inserting the insulation board into the outer skin material through an opening at one side of the outer skin material having a pouch shape;
   evacuating the outer skin material through the opening in a vacuum chamber to provide a vacuum;
   forming a vacuum insulation material by sealing the opening under a vacuum; and
   heating the vacuum insulation material after moving the sealed vacuum insulation material from the vacuum chamber to an oven.

13. The method of claim 12, wherein the core material comprises one or more selected from among glass wool, silica boards, glass boards, and polyurethane (PU) foam.

14. The method of claim 12, wherein the outer skin material comprises at least one material selected from among linear density polyethylene (LDPE), linear low density polyethylene (LLDPE), high density polyethylene (HDPE), chlorinated polypropylene (CPP), and oriented polypropylene films.

15. The method of claim 12, wherein the sealing the opening comprises finishing the opening of the outer skin material by thermal sealing.

16. The method of claim 12, wherein the heating the vacuum insulation material comprises heating the vacuum insulation material at a temperature of 150~200° C.

17. The method of claim 12, wherein the heating the vacuum insulation material comprises heating the vacuum insulation material by infrared radiation heating or hot wind heating.

18. The method of claim 12, wherein the oven comprises a vacuum oven.

19. The method of claim 12, wherein the forming the insulation board comprises arranging the core materials on a plane of a base film, and the base film comprises the same material as a thermal deposition layer of the outer skin material.

* * * * *